United States Patent
Chang et al.

(10) Patent No.: US 9,601,086 B1
(45) Date of Patent: Mar. 21, 2017

(54) DEFINING A PROJECTOR DISPLAY REGION

(75) Inventors: Nelson Liang An Chang, San Jose, CA (US); Niranjan Damera-Venkata, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2322 days.

(21) Appl. No.: 12/558,449

(22) Filed: Sep. 11, 2009

(51) Int. Cl.
| | | |
|---|---|---|
| G09G 5/14 | (2006.01) | |
| G06T 11/60 | (2006.01) | |
| G06T 3/40 | (2006.01) | |
| G06T 15/50 | (2011.01) | |
| G06T 5/50 | (2006.01) | |
| G09G 5/377 | (2006.01) | |
| H04N 5/232 | (2006.01) | |
| H04N 13/00 | (2006.01) | |

(52) U.S. Cl.
CPC .............. G09G 5/14 (2013.01); G06T 11/60 (2013.01); *G06T 3/4038* (2013.01); *G06T 5/50* (2013.01); *G06T 15/503* (2013.01); *G06T 2207/20212* (2013.01); *G06T 2207/20221* (2013.01); *G09G 5/377* (2013.01); *G09G 2340/10* (2013.01); *G09G 2340/12* (2013.01); *G09G 2340/125* (2013.01); *H04N 5/23238* (2013.01); *H04N 13/0044* (2013.01)

(58) Field of Classification Search
None
See application file for complete search history.

(56) References Cited

U.S. PATENT DOCUMENTS

| | | | | |
|---|---|---|---|---|
| 5,903,682 A | * | 5/1999 | Chun | 382/276 |
| 2008/0004505 A1 | * | 1/2008 | Kapit et al. | 600/300 |
| 2010/0231811 A1 | * | 9/2010 | Sajadi et al. | 348/745 |

* cited by examiner

*Primary Examiner* — Jwalant Amin
(74) *Attorney, Agent, or Firm* — HP Inc. Patent Department

(57) ABSTRACT

Defining a display region for a projector display. An image of a camera's view of a display region is accessed. The image is displayed on a graphical user interface. The image has a first set of coordinates. The image and a reference canvas that is displayed on said graphical user interface is integrated. The integration comprises overlaying a portion of the reference canvas on the image. The reference canvas has a second set of coordinates. One of the first set of coordinates and the second set of coordinates represents a mesh of movable control points being movable from a first location to a second location on the graphical user interface. The first set of coordinates are mapped to the second set of coordinates, thereby generating a pointwise correspondence mapping between coordinate points of the reference canvas and coordinate points of the image.

20 Claims, 5 Drawing Sheets

DEFINING A PROJECTOR DISPLAY REGION

FIELD

The field of the present invention relates to computing systems. More particularly, embodiments of the present invention relate to projectors.

BACKGROUND

Computers are widely used today to perform a variety of functions. For example, a computer may be coupled with a projector to aid in projecting an image onto a display screen or other surface. The display screens themselves may comprise a wide range of characteristics. For example, display screens may be small or large, planar or curved, smooth or textured, etc. Furthermore, more than one projector may be used to project light and/or images onto a display screen.

Due to the variable characteristics of the display screen and the possible use of multiple projectors, current projector technology may be used for a wide range of functions. In one example, a business plan may be presented via a projector on a small display screen to a small group of investors. In another example, images intended for thousands of viewers of a concert may be projected in real-time onto a very large screen. While functional in many different environments and situations, there also exist many limitations to the technology relating to projectors.

BRIEF DESCRIPTION OF THE DRAWINGS

The accompanying drawings, which are incorporated in and form a part of this specification, illustrate embodiments of the present technology for defining a display region, together with the description, serve to explain principles discussed below.

Figure 1:
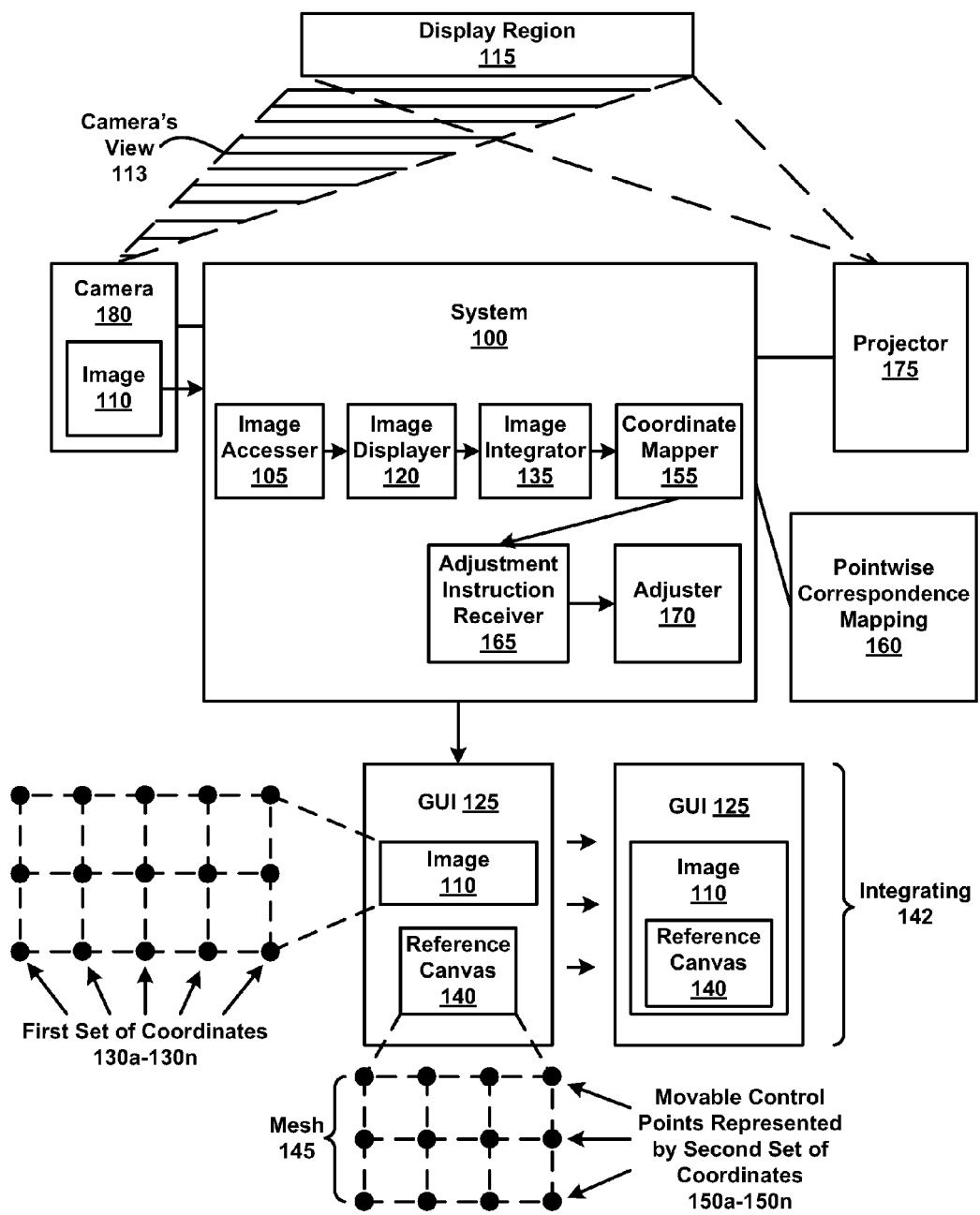
FIG. 1 is a block diagram of an example system 100 for defining a display region for a projector display, in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "accessing", "displaying", "integrating", "mapping", "receiving", "adjusting", "performing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers. It should be appreciated that in one embodiment, the present technology may be hardware and firmware, while in another embodiment, the present technology may be hardware and software.

Overview

A multi-projector display may use one or more projectors and one or more calibration cameras to form a high quality display that is seamless over a particular display region (the desired reference canvas). For example, through calibration techniques known in the art (e.g., mapping), calibration cameras aid in making a system, that includes a plurality of projectors, behave as one seamless display, despite the arbitrary geometries of these projectors/keystoning and other differences (e.g. color, luminance, etc.).

Traditionally, mapping is difficult to perform on ambiguous (not easily discernable) display regions. In some instances, the desired display region is unambiguous (e.g., a planar surface with delineated edges or with some other fiducial markings) and is directly discernable. However, in other instances, the desired display region may be ambiguous. For example, even though the display surface may be a planar surface, a user may wish to project an image in only a portion of this display surface, thereby making the desired display region ambiguous. The display surface may even be non-rectangular. Furthermore, the display surface may be arbitrarily curved/shaped, thus making it difficult to discern how best to remap the projected display, under conventional methods.

Embodiments of the present technology provide a graphical user interface to aid in the determination of the reference canvas for a multi-projector display. In the context of embodiments of the present technology, the term "reference canvas" refers to the desired area that may or may not contain a recognizable image that is to occupy a portion of a display screen.

Furthermore, embodiments of the present technology enable fast definition (specification) for at least one of the control points of the reference canvas in the camera's view. This helps to specify or refine the mapping (parametric or nonparametric) between the reference canvas to the image shown from the camera's view, thus helping to establish the direct mapping between each projector and the reference canvas (and vice versa) via composition. Embodiments of the present technology also enable images to be displayed on non-traditional surface shapes (e.g. curved wall, arbitrary shapes) as well as non-traditional canvas shapes (e.g. non-rectangular).

More particularly and in brief, embodiments of the present technology enable defining a display region for a projector display. In one embodiment, the image of a camera's view of a display region is accessed. This image is then displayed on a graphical user interface (GUI). The image is integrated with a reference canvas displayed on the GUI. The integrating comprises overlaying a portion of the reference canvas on the image. The reference canvas comprises a mesh of movable control points represented by a second set of coordinates. The movable control points are movable from a first location on the image to a second location on the graphical user interface. Then, the first set of coordinates are mapped to the second set of coordinates, thereby generating a pointwise correspondence mapping between coordinate points of the reference canvas and the coordinate points of the image.

Thus, embodiments of the present technology provide for defining a display region for a projector display, given a reference canvas and a camera's view of the display region.

Example Architecture of a System for Defining a Display Region for a Projector Display FIG. 1 is a block diagram of an example of a system 100 for defining a display region for a projector display upon which embodiments of the present technology can be implemented. The system 100 of FIG. 1 and each of its elements may include elements other than those shown or described herein.

In one embodiment, system 100 includes an image accesser 105, an image displayer 120, an image integrator 135, and a coordinate mapper 155. In further embodiments of the present technology, the system 100 includes an adjustment instruction receiver 165 and an adjuster 170.

Additionally, FIG. 1 shows system 100 coupled with camera 180 and projector 175. While only one camera 180 and one projector 175 are shown in FIG. 1, it should be appreciated that more than one camera and more than one projector may be used in embodiments of the present technology. Furthermore, FIG. 1 shows projector 175 projecting light and/or an image towards display region 115. Further, camera 180 is shown capturing the image 110 of the camera's view 113 of the display region 115. In one embodiment, only a portion less than the whole of the field of view of the projector 175 overlaps with the camera 180. However, in another embodiment, the whole field of view of the projector 175 overlaps with the camera 180.

Figure 2:
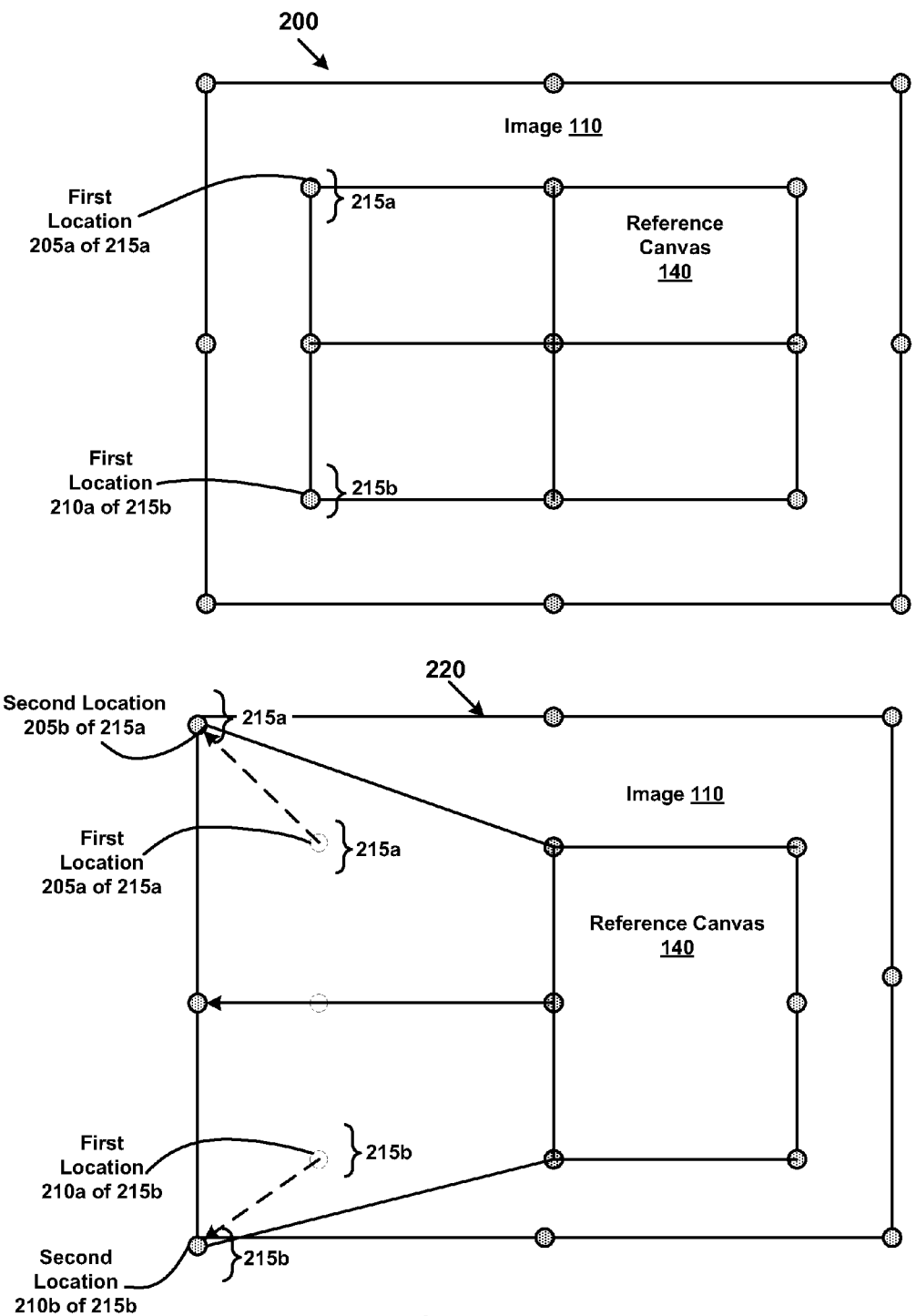
FIG. 2 is a block diagram of an example integration of an image of a camera's view of a display region with a reference canvas, in accordance with embodiments of the present technology.

Additionally, FIG. 1 shows GUI 125 comprising an image 110 of a camera's view 113 and reference canvas 140. The image of a camera's view 110 comprises a first set of coordinates 130a-130n. Each of set of coordinates 130a-130n corresponds to an x and a y coordinate that determines a precise location. Reference canvas 140 comprises second set of coordinates 150a-150n. In one embodiment, the first set of coordinates 130a-130n represents a mesh 145 of movable control points. In another embodiment, the second set of coordinates 150a-150n represents a mesh 145 of movable control points. While FIGS. 1 and 2 show second set of coordinates 150a-150n associated with reference canvas 140 representing the mesh 145 of movable control points, it should be appreciated as and as described herein, that first set of coordinates 130a-130n may represent the mesh 145 of movable control points.

It may be important to provide additional context to the user of the estimated reference canvas shape in the camera's view 113. To this end, in one embodiment, projector 175 may project an all-white image, which is likely to be a superset of the reference canvas 140). Additionally, and as stated herein, projector 175 may be more than one projector. Thus, in one embodiment, all of the projectors may project an all-white image that forms a superset of the reference canvas 140. In another embodiment, a textured image may be used to provide context for the reference canvas 140.

Of note, the image displayed on the GUI 125 may not be the same dimension as the camera's view of a display region and/or the reference. For example, what is displayed on the GUI 125 may be a scaled version of the integrated view of the image from the camera's view and the reference canvas. Thus, a scaled down version of the integrated view enables the images and the mesh to be viewed in their entirety.

Furthermore, each of the second set of coordinates 150a-150n corresponds to an x and a y coordinate that determines a precise location of that movable control point. In one embodiment, the reference canvas 140 comprises a mesh of at least four movable control points. In another embodiment, the image 110 comprises a mesh of at least four movable control points. The movable control points have implicit coordinates in the reference space $(x_i, y_i)$. and the GUI 125 coordinates implicitly give their corresponding location in the camera view $(u_i, v_i)$. Furthermore, FIG. 1 also shows an example of GUI 125 having the reference canvas 140 overlaid on image 110 as part of integrating 142, as will be explained in the operating section below.

Additionally, and without loss of generality, it is assumed that the movable control points are regularly spaced in the reference canvas. However, it is understood that the movable control points do not have to be regularly spaced.

Referring to FIGS. 1 and 2, a block diagram of an example integration of an image of a camera's view 113 of a display region 115 with a reference canvas 140 is shown, in accordance with embodiments of the present technology. 200 of FIG. 2 shows a view of a reference canvas 140 overlaid on image 110 before movable points are moved from a first location on the graphical user interface to a second location on the graphical user interface. 220 of FIG. 2 shows a view of a reference canvas 140 overlaid on image 110 after movable points are moved from a first location to a second location.

Referring to 200 of FIG. 2, shown is a first location 205a of a movable control point 215a. Also shown is a first location 210a of a movable control point 215b. Referring now to 220 of FIG. 2, shown is a first location 205a from which movable control point 215a is moved to second location 205b. Also shown is a first location 210a from which movable control point 215b is moved to second location 210b. FIG. 2 illustrates the flexibility enabled by being able to move the movable control points comprising the mesh 145 around the GUI 125. FIG. 2 shows just one example of the edges of the reference canvas 140 being newly defined by movement of the movable control points. However, it should be appreciated that while FIG. 2 shows one embodiment of the edges of a reference canvas 140 being defined; the edges of the reference canvas 140 may be defined (altered) in a manner different from FIG. 2, in response to the movement of movable control points.

Figure 3:
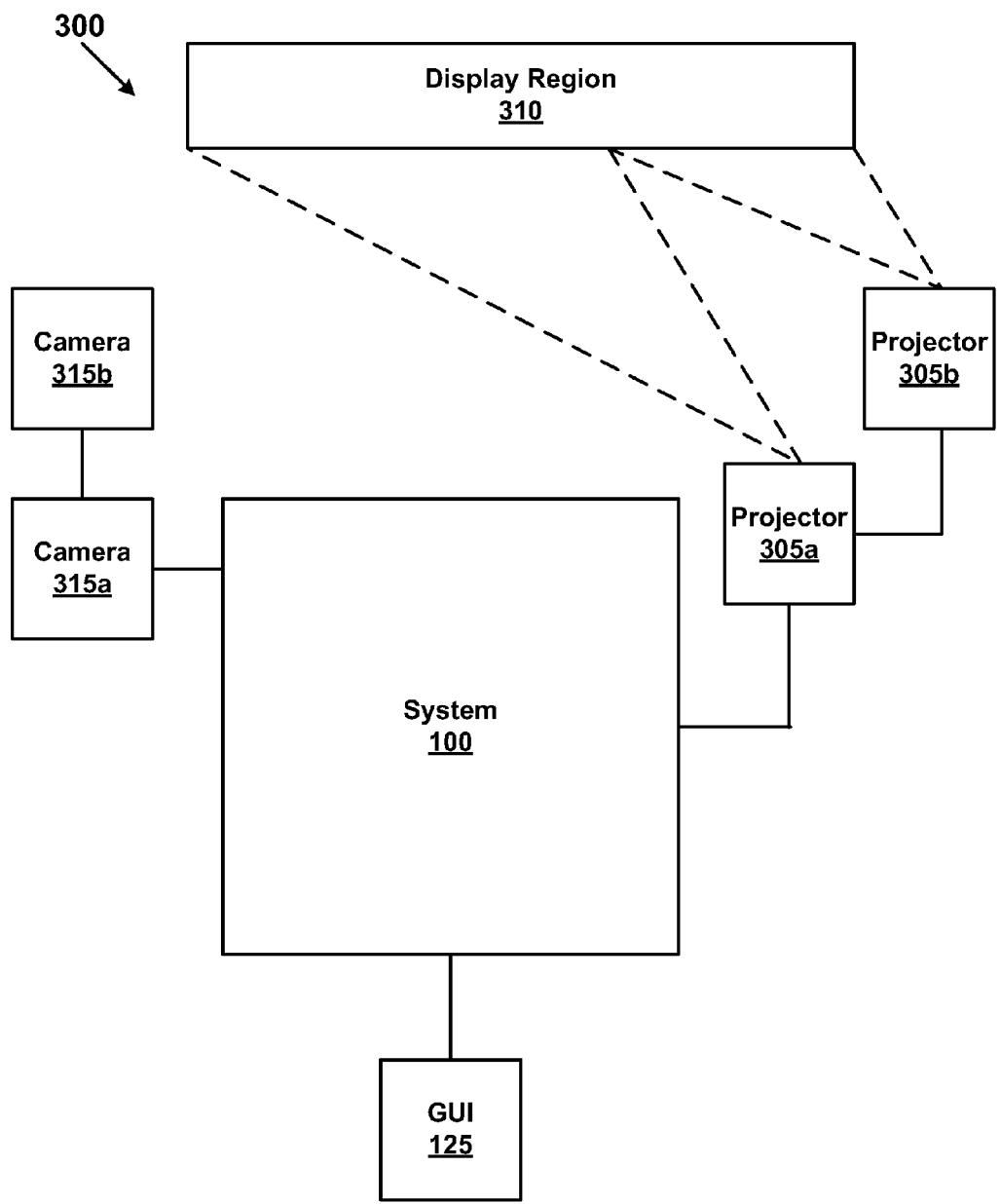
FIG. 3 is a block diagram of an example display system 300 for specifying a display region, in accordance with embodiments of the present technology.

Referring now to FIG. 3, a block diagram of an example display system 300 for specifying a display region is shown, in accordance with embodiments of the present technology. Display system 300 shows system 100 coupled with one or more camera's 315a and 315b, one or more projectors 305a and 305*b* and a GUI 125. Furthermore, display system 300 shows display region 310 being the target of a projection of light and/or image(s) by one or more projectors 305*a* and 305*b*.

It should be appreciated that the one or more cameras 315*a* and 315*b* and the one or more projectors 305*a* and 305*b* are coupled with a first computing device, while the system 100 is coupled with a second computing device that enables a GUI 125 to be displayed. In one embodiment, system 100 controls the one or more cameras 315*a* and 315*b*, the one or more projectors 305*a* and 305*b* and the GUI 125. In another embodiment, one computing device, such as system 100, controls the one or more cameras 315*a* and 315*b* and the one or more projectors 305*a* and 305*b*, while another computing device controls the GUI 125. The first computing device and the second computing device, in one embodiment, are coupled with each other via a network. In one embodiment, the system 100 is controlled remotely, and information from the second computing device coupled with the system 100 is sent to the first computing device over the network.

Example Operation of a System for Defining a Display Region for a Projector Display More generally, in embodiments in accordance with the present technology, system 100 is utilized to define (specify) a display region for a projector display. System 100 enables a user to interactively control one or more movable control points on a reference canvas or an image of a camera's view of a display screen, thereby helping to define the mapping between the reference canvas and the calibration of a camera's viewpoint.

In general, the elements of FIG. 1 are described according to the functions they perform. However, elements may perform functions in addition to those described herein. Also, functions described as being performed by multiple elements may instead be performed by a single element. Similarly, multiple functions described as being performed by a single (e.g., multifunctional) element may instead be divided in some way amongst a number of individual elements.

More particularly, and referring still to FIG. 1, in one embodiment, an image accesser 105 accesses an image 110 of a camera's view 113 of a display region 115. In other embodiments, more than one camera is utilized to view the display region 115 and provide an image 110. When more than one camera is utilized, the image 110 is a result of a common camera coordinate system view.

In one embodiment, an image displayer 120 displays the image 110 on a graphical user interface 125. The image 110 has a first set of coordinates 130*a*-130*n*. Of note and as described herein, first set of coordinates 130*a*-130*n* may comprise any number of coordinates other than those shown in FIG. 1.

In one embodiment, an image integrator 135 integrates the image 110 with a reference canvas 140. The integrating 142, as shown in FIG. 1, includes overlaying a portion of the reference canvas 140 on the image 110. The reference canvas 140 has a second set of coordinates 150*a*-150*n*. In FIG. 1, the second set of coordinates 150*a*-150*n* of the reference canvas 140 represents the mesh of movable control points. These movable control points are movable from a first location to a second location, as will be explained below with reference to FIG. 2. Additionally, these movable control points may be used to define deformation of texture of the reference canvas 140. It should be appreciated that the "portion" of the reference canvas 140 that is overlaid onto image 110 may comprise the entire reference canvas 140 or any part thereof.

Furthermore, while having many movable control points enables better definition and more fine control of the reference canvas, it may also be cumbersome. Providing a smaller number of movable control points may still provide enough control while being manageable. These movable control points start in some initial configuration. As described herein, one possibility is that the movable control points are regularly spaced to form a grid. Alternatively, an initial step of feature detection/fiducial tracking may be used to provide a more likely initial guess as to the initial configuration of the movable control points.

While the above example describes the system 100 as already comprising the reference canvas 140, it should be appreciated that the system 100, in one embodiment, may access the reference canvas 140 and display this reference canvas 140 on the GUI 125. This reference canvas 140 may be accessed from a computer system with which system 100 is coupled, due to instructions from a user and/or pre-programmed instructions.

In one embodiment, coordinate mapper 155 maps the first set of coordinates 130*a*-130*n* to the second set of coordinates 150*a*-150*n*, thereby generating a pointwise correspondence mapping between coordinate points of the image 110 and the coordinate points of the reference canvas 140. In the context of embodiments of the present technology, the term "map" refers to assigning numbers representing coordinates such that a particular point on the reference canvas 140 (represented by a coordinate pair) corresponds directly to a particular point on the image 110 (represented by a coordinate pair) or vice versa. For example, numbers are assigned representing coordinates such that a particular point on the image 110 corresponds directly to a particular point on the reference canvas 140. It is understood that methods of "mapping" coordinates to each other is well known in the art.

In one embodiment, a denser mapping may be established by interpolating the mesh of movable control points to form a nonparametric representation. Alternatively, an underlying parametric model (e.g. homography, 2-D quadric surfaces, splines, sets of 1-D contours, etc.) may be imposed to help reduce noise. The mapping may be composed with a camera-to-projector mapping to determine the direct reference-to-projector mapping for all projectors.

Additionally, in one embodiment, an adjustment instruction receiver 165 receives adjustment instructions via the movable control points represented by the second set of coordinates 150*a*-150*n*. The adjustment instructions comprise movement of the movable control points from a first location to a second location. These adjustment instructions may originate from a user or be pre-programmed in the system 100. In another embodiment, an adjuster 170 adjusts the portion of the reference canvas 140 on the image 110 according to the adjustment instructions. In one embodiment, the GUI 125 automatically updates the shape of the reference canvas 140 (and warps accordingly the textured image). This automatic updating by the GUI 125 may occur in real time, and/or at a pre-determined time.

Referring now to 200 of FIG. 2, reference canvas 140 is overlaid upon image 110. Reference canvas 140 has a movable control point 215*a* at a first location 205*a* on image 110. In one embodiment, for automatic selection of a movable control point to move, the mouse position will have to be within a certain tolerance of a movable control point.

Referring now to 220 of FIG. 2, the movement by a mouse of the control point with the pair of coordinates represented by 215a has the effect of stretching the reference canvas 140 to accommodate the movement. For example, a user may use a click-and-drag operation via a mouse, or other similar device, to move a movable control point with a pair of coordinates represented by 215a from first location 205a on image 110 to second location 205b of image 110. Similarly, a movable control point with a pair of coordinates represented by 215b may be moved from first location 210a to second location 210b. This overall movement of movable control points causes the reference canvas 140 to be stretch towards the edge of image 110. Movement of other movable control points of reference canvas 140 will enable a user to create a reference canvas 140 that fills the entire space of image 110 or any portion therein. Of note, embodiments of the present technology are not limited to the "stretching" example given in 220 of FIG. 2. For example, the movement of one controllable point may cause the movement of other controllable points in a manner different from that which is shown in 220 of FIG. 2.

The click-and-drag operation of the mouse is an example of an adjustment instruction as received by adjustment instruction receiver 165. However, it is understood that methods of communicating an adjustment instruction to system 100 are not limited to an operation of a mouse.

It should also be understood that while FIG. 2 shows one example of an implementation of embodiments of the present technology, it is not limited to such. For example, a user may create a smaller reference canvas 140 than that which is originally displayed. Furthermore, the user may create a reference canvas 140 that is not a rectangle; the reference canvas 140 may be changed to be an irregular shape. Additionally, a plurality of reference canvases may be displayed on image 110. This plurality of reference canvases may be similarly manipulated.

In one embodiment, system 100 may function as part of a camera calibration process. In another embodiment, system 100 may function as one or more images are being rendered onto the display region 115 by one or more projectors.

Thus, embodiments of the present technology use a GUI to quickly define a display region for a projector display. This projector display may be curved and/or arbitrarily shaped. Moreover, the use of non-uniform sampling in regions where uniform sampling significantly under samples the mapping allows increased accuracy on non-standard screen shapes.

Figure 4:
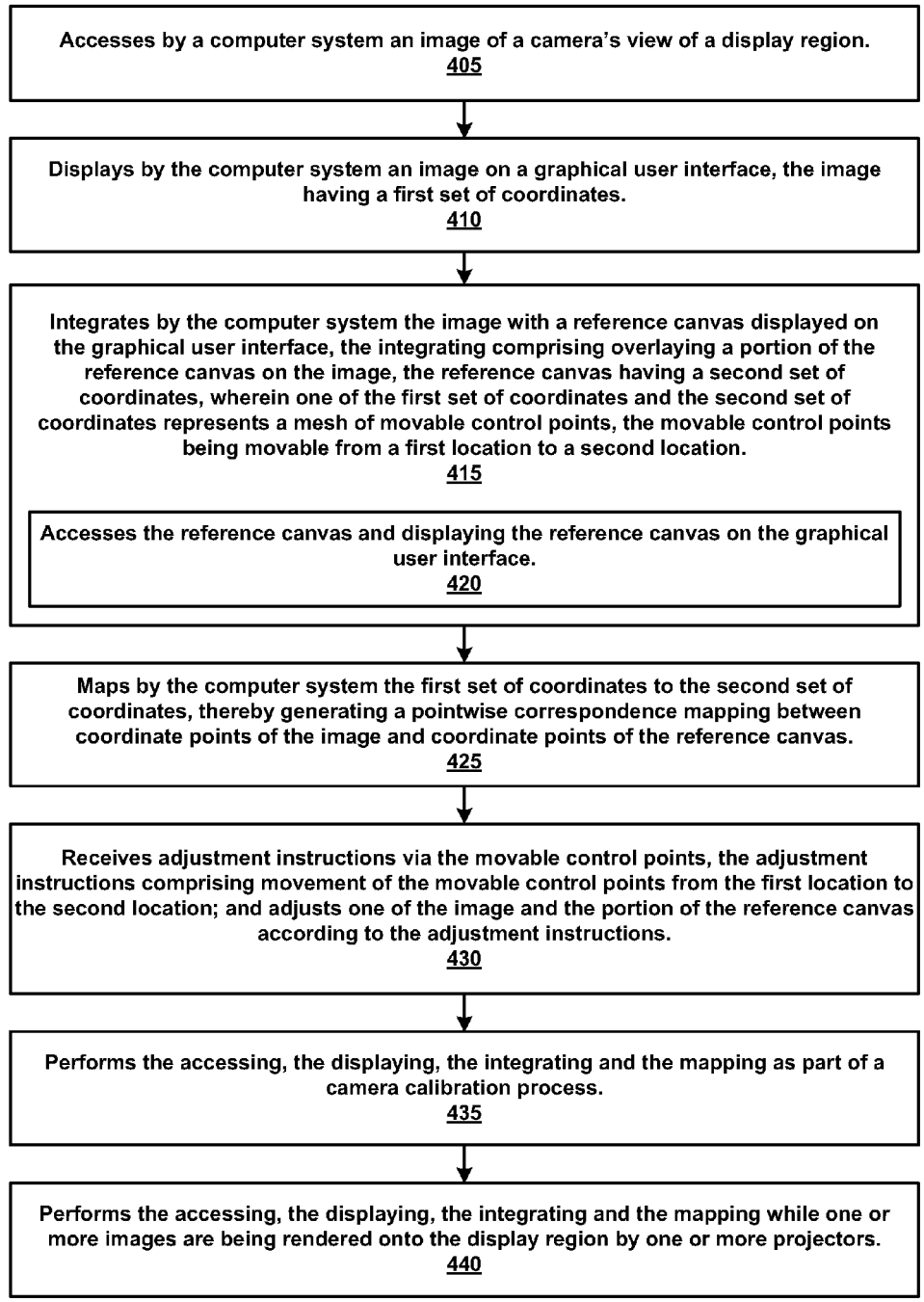
FIG. 4 is a flowchart 400 of an example method for defining a display region for a projector display, in accordance with embodiments of the present technology.

FIG. 4 is a flowchart of an example method for defining a display region, in accordance with embodiments of the present technology. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 400 is performed by system 100 of FIG. 1. In one embodiment, system 100 includes more than one computer controlling one or more of the following: projector(s); camera(s) and GUI(s).

Referring to 405 of FIG. 4 and as described herein, in one embodiment, an image 110 of a camera's view 113 of a display region 115 is accessed.

Referring now to 410 of FIG. 4 and as described herein, in one embodiment, an image 110 is displayed on a GUI 125, the image 110 having a first set of coordinates 130a-130n.

Referring now to 415 of FIG. 4 and as described herein, in one embodiment, the image 110 is integrated with a reference canvas 140 that is displayed on the GUI 125, the integrating comprising overlaying a portion of the reference canvas 140 on the image 110. The reference canvas has a second set of coordinates 150a-150n. One of the first set of coordinates 130a-130n and the second set of coordinates 150a-150n comprises a mesh of movable control points. The movable control points are movable from a first location to a second location. In one embodiment, and referring to 420 of FIG. 4 and as described herein, the integrating of 415 comprises accessing the reference canvas 140 and displaying the reference canvas 140 on the GUI 125.

Referring now to 425 of FIG. 4 and as described herein, in one embodiment the first set of coordinates 130a-130n are mapped to the second set of coordinates 150a-150n, thereby generating a pointwise correspondence mapping between coordinate points of the reference canvas and coordinate points of the image 110.

Referring now to 430 of FIG. 4 and as described herein, in one embodiment adjustment instructions are received via movable control points, the adjustment instructions comprising movement of the movable control points from a first location on the image 110 to a second location. A portion of the reference canvas 140 is adjusted according to the adjustment instructions.

Referring now to 435 of FIG. 4 and as described herein, in one embodiment the performing of the accessing 405, the displaying 410, the integrating 415 and the mapping 425 are part of a camera calibration process. Referring now to 440 of FIG. 4 and as described herein, in one embodiment the performing of the accessing 405, the displaying 410, the integrating 415 and the mapping 425 is done while one or more images are being rendered onto the display region 115 by one or more projectors.

Thus, embodiments of the present technology enable a faster and less ambiguous method of defining a display region for a projector display. Complicated projector display surfaces and regions may be specified. Furthermore, embodiments of the present technology may be applied for parametric and nonparametric mappings alike. Moreover, the GUI of embodiments of the present technology enables the user to use non-uniform sampling (by increasing patch density) in regions where uniform sampling significantly undersamples the mapping. This allows increased accuracy on non-standard display screen shapes.

Example Computer System Environment

Figure 5:
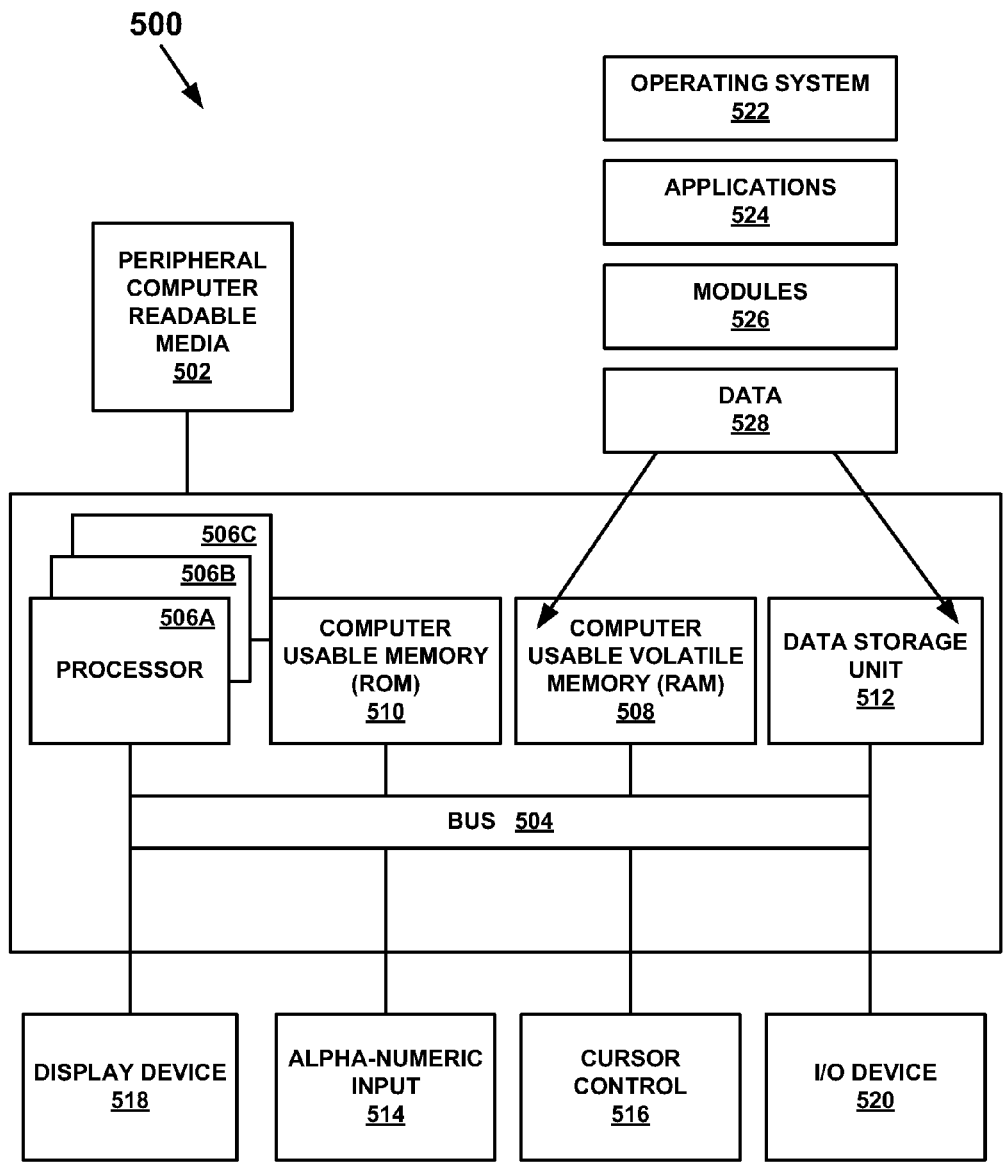
FIG. 5 is a diagram of an example computer system 500 enabling defining of a display region, in accordance with embodiments of the present technology.

FIG. 5 illustrates an example computer system 500 used in accordance with embodiments of the present technology. It is appreciated that system 500 of FIG. 5 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 5, computer system 500 of FIG. 5 is well adapted to having peripheral computer readable media 502 such as, for example, a compact disc, and the like coupled therewith.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. A graphics processing unit may also comprise processor 506A, 506B, and/or 506C. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alphanumeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands. Additionally, the display device may be a touch screen designed to enable the dynamic signaling of a movement of a visible symbol (e.g., cursor) on a display screen of display device 518. Furthermore, a touch screen may be considered a part of display device 518 enabling input through the screen itself via various input objects (e.g., finger, stylus, etc.).

System 500 is also well suited to having a cursor directed by other means such as, for example, voice commands. System 500 also includes an I/O device 520 for coupling system 500 with external entities.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present invention, for example, is stored as an application 524 or module 526 in memory locations within RAM 508 and memory areas within data storage unit 512.

Computing system 500 is only one example of a suitable computing environment and is not intended to suggest any limitation as to the scope of use or functionality of embodiments of the present technology. Neither should the computing environment 500 be interpreted as having any dependency or requirement relating to any one or combination of components illustrated in the example computing system 500.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for defining a display region for a projector display, said method comprising:
   accessing by a computer system an image of a camera's view of a display region, wherein said image is at least a portion of a projection on said display region from at least one projector;
   displaying by said computer system said image on a graphical user interface, said image having a first set of coordinates;
   integrating by said computer system said image with a reference canvas displayed on said graphical user interface, said integrating comprising overlaying a portion of said reference canvas on said image, said reference canvas having a second set of coordinates, wherein one of said first set of coordinates and said second set of coordinates represents a mesh of movable control points, said movable control points being movable from a first location to a second location on said graphical user interface; and
   mapping by said computer system said first set of coordinates to said second set of coordinates, thereby generating a pointwise correspondence mapping between coordinate points of said image and coordinate points of said reference canvas.

2. The computer-implemented method of claim 1, further comprising:
   receiving adjustment instructions via said movable control points, said adjustment instructions comprising movement of said movable control points from said first location to said second location; and
   adjusting one of said image and said portion of said reference canvas according to said adjustment instructions.

3. The computer-implemented method of claim 1, wherein said integrating comprises:
   accessing said reference canvas and displaying said reference canvas on said graphical user interface.

4. The computer-implemented method of claim 3, further comprising:

performing said accessing, said displaying, said integrating and said mapping while one or more images are being rendered onto said display region by one or more projectors.

5. The computer-implemented method of claim 1, further comprising:
performing said accessing, said displaying, said integrating and said mapping as part of a camera calibration process.

6. The computer-implemented method of claim 1, further comprising:
utilizing uniformly spaced movable control points as said mesh of movable control points.

7. The computer-implemented method of claim 1, further comprising:
utilizing non-uniformly spaced movable control points as said mesh of movable control points.

8. The computer-implemented method of claim 1, further comprising:
utilizing a mesh of movable control points tessellated with rectangles.

9. The computer-implemented method of claim 1, further comprising:
utilizing a mesh of movable control points tessellated with arbitrary shapes.

10. A computer system for defining a display region for a projector display, said computer system comprising:
an image accessor configured for accessing an image of a camera's view of a display region, wherein said image is at least a portion of a projection on said display region from at least one projector;
an image displayer configured for displaying said image on a graphical user interface, said image having a first set of coordinates;
an image integrator configured for integrating said image with a reference canvas displayed on said graphical user interface, said integrating comprising overlaying a portion of said reference canvas on said image, said portion of said reference canvas having a second set of coordinates, wherein one of said first set of coordinates and said second set of coordinates represents a mesh of movable control points, said movable control points being movable from a first location to a second location on said graphical user interface; and
a coordinate mapper configured for mapping said first set of coordinates to said second set of coordinates, thereby generating a pointwise correspondence mapping between coordinate points of said image and coordinate points of said reference canvas.

11. The computer system of claim 10, further comprising:
an adjustment instruction receiver configured for receiving adjustment instructions via said movable control points, said adjustment instructions comprising movement of said movable control points from said first location to said second location.

12. The computer system of claim 11, further comprising:
an adjuster configured for adjusting one of said image and said portion of said reference canvas according to adjustment instructions.

13. The computer system of claim 10, wherein one of said image and said portion of said reference canvas comprises a mesh of at least four movable control points.

14. The computer system of claim 10, wherein said movable control points are positioned in a predetermined initial configuration on one of said image and said portion of said reference canvas.

15. The computer system of claim 14, wherein said initial configuration comprises uniformly spaced movable control points.

16. The computer system of claim 14, wherein said initial configuration comprises non-uniformly spaced movable control points.

17. The computer system of claim 10, wherein said mesh is tessellated by rectangles.

18. The computer system of claim 10, wherein said mesh is tessellated by arbitrary shapes.

19. A display system comprising:
at least one projector configured for projecting onto a display region;
at least one calibration camera configured for viewing at least a portion of a projection on said display region from said at least one projector;
a graphical user interface; and
a computer system for defining said display region for a projector display, said computer system coupled with said at least one projector, said at least one calibration camera and said graphical user interface, said computer system comprising:
an image accesser configured for accessing an image of said at least one calibration camera's view of a display region, wherein said image is at least a portion of a projection on said display region from said at least one projector;
an image displayer configured for displaying said image on said graphical user interface, said image having a first set of coordinates;
an image integrator configured for integrating said image with a reference canvas displayed on said graphical user interface, said integrating comprising overlaying a portion of said reference canvas on said image, said portion of said reference canvas having a second set of coordinates, wherein one of said first set of coordinates and said second set of coordinates represents a mesh of movable control points, said movable control points being movable from a first location to a second location on said graphical user interface; and
a coordinate mapper configured for mapping said first set of coordinates to said second set of coordinates, thereby generating a pointwise correspondence mapping between coordinate points of said image and coordinate points of said reference canvas.

20. The display system of claim 19, wherein said image is a common camera coordinate system view when more than one calibration camera is utilized to view said at least a portion of a projection on said display region from said at least one projector.

* * * * *